(12) United States Patent
Harris

(10) Patent No.: US 6,331,083 B1
(45) Date of Patent: Dec. 18, 2001

(54) INDIVIDUAL KEY COVERS FOR COMPUTER KEYBOARDS

(76) Inventor: Brook Lee Harris, 1701 Albert St., St. Paul, MN (US) 55113

( * ) Notice: Subject to any disclaimer, the term of this patent is extended or adjusted under 35 U.S.C. 154(b) by 0 days.

(21) Appl. No.: 09/633,745

(22) Filed: Aug. 7, 2000

Related U.S. Application Data

(60) Provisional application No. 60/204,605, filed on May 16, 2000.

(51) Int. Cl.[7] .......................................................... B41J 5/12
(52) U.S. Cl. .............................. 400/493; 400/494; 400/490
(58) Field of Search ..................................... 400/487, 485, 400/493, 490, 493.1, 494

(56) References Cited

U.S. PATENT DOCUMENTS

| | | | | |
|---|---|---|---|---|
| D. 358,383 | * | 5/1995 | Wagstrom ............................ D14/115 |
| 832,617 | * | 10/1906 | Munson et al. . | |
| 1,041,696 | * | 10/1912 | Summerville . | |
| 3,848,723 | * | 11/1974 | Hogue ................................... 197/102 |
| 4,042,090 | * | 8/1977 | Hasebe et al. ........................ 197/102 |
| 4,180,336 | * | 12/1979 | Lonsdale ............................ 400/491.3 |
| 4,565,460 | * | 1/1986 | Kline .................................... 400/490 |
| 4,755,072 | * | 7/1988 | Hoornweg ............................ 400/490 |
| 5,183,346 | * | 2/1993 | Tesar .................................... 400/490 |
| 5,290,115 | * | 3/1994 | Little .................................... 400/491 |
| 5,483,235 | * | 1/1996 | Hanson et al. ......................... 341/20 |
| 5,622,548 | * | 4/1997 | Zou .................................... 106/20 C |
| 5,700,097 | * | 12/1997 | Kuhlenschmidt .................... 400/487 |
| 5,757,292 | * | 5/1998 | Amro et al. ........................... 341/22 |
| 5,981,625 | * | 11/1999 | Zou et al. ............................. 523/161 |

* cited by examiner

Primary Examiner—Ren Yan
Assistant Examiner—Kevin D. Williams
(74) Attorney, Agent, or Firm—Thomas B. Tate

(57) ABSTRACT

Key covers for individual keys of a computer keyboard. Each key cover has a colored background and a fluorescent letter corresponding to the letter key to which it is affixed. Each cover is the same size as the key it covers but the letter on each key is larger than the corresponding letter on the computer key. Each key cover is removably attached to the key by adhesive means.

2 Claims, 1 Drawing Sheet

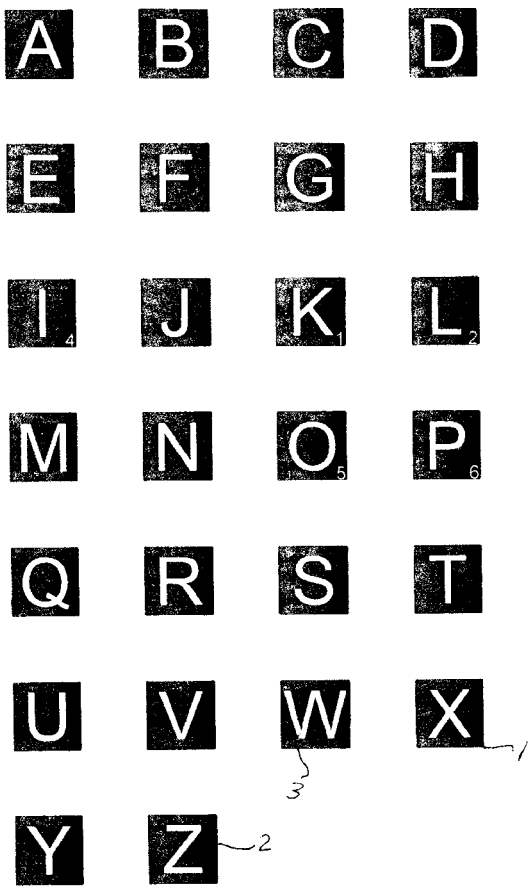

| | | | |
|---|---|---|---|
| A | B | C | D |
| E | F | G | H |
| I | J | K | L |
| M | N | O | P |
| Q | R | S | T |
| U | V | W | X |
| Y | Z | | |

INDIVIDUAL KEY COVERS FOR COMPUTER KEYBOARDS

Provisional patent application No. 60/204,605 was filed on May 16, 2000.

BACKGROUND OF THE INVENTION

The field of the invention is key covers for computer keyboards.

Although there are many types of key covers which cover an entire computer keyboard, usually to protect the keys from dust when not in use, there is only one known example of a key cover for an individual key of a computer keyboard. U.S. Pat. No. 5,385,417 to Wade et al. discloses a key cover which has a pair of spaced apart feet, a pair of sidewalls extending upwardly from the feet, and a top wall connecting the sidewalls, with an opening in the top wall. This structure is different from the present invention and is designed for a different purpose, namely, to avoid inadvertently striking certain keys.

Color coding of computer keys is also known in the prior art, for example, U.S. Pat. No. 5,700,097 to Kuhlenschmidt, which also discloses enlarged keys. In the prior art, however, it is the keys themselves which are colored, rather than a key cover. No prior art has been found which discloses the use of a key cover with a colored background and fluorescent letters.

SUMMARY OF THE INVENTION

The invention is key covers for individual keys of a computer keyboard, each key having a colored background and a fluorescent letter of a contrasting color. Each key cover is about the same size as the key it is intended to cover, and can be firmly but removably attached to the key by adhesive means.

An object of the invention is to make it easier for people to see the keys better at all times, including under low light circumstances.

Another object of the invention is to provide a multi-colored background in order to enable people to distinguish each key more easily.

Still another object of the invention is to make it easier for people, especially children, to learn to type on a computer keyboard by providing key covers of one color for keys to be typed with the right hand and key covers of a contrasting color for keys to be typed with the left hand.

DESCRIPTION OF THE DRAWING

The FIGURE is a top view.

DESCRIPTION OF THE INVENTION

The key covers are for individual keys of a computer keyboard. Each key cover 1 is a generally rectangular piece of malleable material (preferably plastic or Mylar) which has a colored background 2 and a letter 3 of a contrasting color. Each key cover 1 has a large fluorescent letter 3 which corresponds to the letter on the key upon which the key cover 1 will be affixed when in use. The background 2 of each key cover 1 is a non-fluorescent color which contrasts with the color of the letter 3 on background 2. More than one color may be used in a given background 2, but a single color is more typical. One version will have white letters 3 on a black background 2. Other versions will have different colors for each letter of the alphabet or alternatively will have all key covers 1 for keys typed with the right hand be one color and those for keys typed with the left hand be another color. Any combination of colors may be used provided that the fluorescent letter 3 is easily visible against the background 2.

Each key cover 1 is the same size as the corresponding computer key which it will cover. Standard computer keys are seven-sixteenths of an inch wide by one-half inch long. Each key cover 1 is about seven-sixteenths of an inch wide by one-half inch long. Each key cover 1 can be affixed firmly but removably to its corresponding key by means of an adhesive provided on the bottom surface of the key cover 1. Each key cover 1 is coated on top with a coating material such as Lexon in order to prevent the fluorescent ink of the letter 3 from wearing away.

A set of key covers 1 can be made by processes known in the label-making industry. For example, a sheet three and one-quarter inches wide by five and one-half inches long would be rolled off, containing twenty-six key covers 1, one for each letter of the alphabet. Each cover 1 is peeled off during the manufacturing process so that it can be applied to its computer key individually. The key cover 1 will look like part of the key when in use.

Although shown in alphabetical order in the figure and usually made that way on the sheet, the key covers 1 are designed to be applied to computer keys arranged in standard order. These key covers are especially suitable for laptops and personal computers but may be used with other types of computers or with typewriters or other office machines having a keyboard. Furthermore, additional key covers could be made for numbers, symbols, etc. on a keyboard.

I claim.:

1. Key covers for being affixed to individual keys of a computer keyboard, each of said key covers consisting of:

a thin flat generally rectangular piece of plastic material which is approximately the same size as the key it is intended to cover;

said piece of plastic material consisting of a colored background and a large fluorescent letter of a color contrasting with said background, said large fluorescent letter being colored by means of fluorescent ink and being coated on top by a coating material in order to prevent said fluorescent ink from wearing away, said letter corresponding to a letter on the key to which said cover is to be affixed;

said cover having on its bottom surface adhesive means for firmly but removably affixing said cover to its corresponding key.

2. A laptop computer having a keyboard comprising the key covers of claim 1.

* * * * *